US009953099B2

(12) United States Patent
Creel (10) Patent No.: US 9,953,099 B2
(45) Date of Patent: Apr. 24, 2018

(54) REPACKAGEABLE VIRTUALIZED TRANSPARENT ACCESS TO HETEROGENEOUS DATA SOURCES

(75) Inventor: Christopher T. Creel, Birmingham, AL (US)

(73) Assignee: DST Health Solutions, LLC, Kansas City, KS (US)

( * ) Notice: Subject to any disclaimer, the term of this patent is extended or adjusted under 35 U.S.C. 154(b) by 1327 days.

(21) Appl. No.: 12/971,541

(22) Filed: Dec. 17, 2010

(65) Prior Publication Data

US 2012/0158699 A1 Jun. 21, 2012

(51) Int. Cl.
*G06F 7/00* (2006.01)
*G06F 17/30* (2006.01)

(52) U.S. Cl.
CPC .............. *G06F 17/30893* (2013.01)

(58) Field of Classification Search
USPC ......................................... 707/722
See application file for complete search history.

(56) References Cited

U.S. PATENT DOCUMENTS

| | | | |
|---|---|---|---|
| 6,490,585 B1 * | 12/2002 | Hanson et al. | |
| 6,772,159 B1 * | 8/2004 | Blount et al. | |
| 7,693,268 B2 * | 4/2010 | Rossi et al. | 379/112.06 |
| 8,130,924 B2 * | 3/2012 | Rossi et al. | 379/112.06 |
| 2005/0276394 A1 * | 12/2005 | Rossi et al. | 379/88.17 |

(Continued)

OTHER PUBLICATIONS

JBoss, a division of RedHat, "*Metamatrix Enterprise Data Services Platform*", ww.redhat.com, © 2008 Red Hat Middleware, LLC, 8 pgs.

*Primary Examiner* — Tuan A Pham
*Assistant Examiner* — Muluemebet Gurmu
(74) *Attorney, Agent, or Firm* — Lempia Summerfield Katz LLC (57) ABSTRACT

A transparent data access interface/layer for repackageable virtualized transparent access to heterogeneous business process data sources, internally maintained or outsourced, is disclosed. This data access interface provides substantially real time customer/client specific, i.e. transparent, access to a customer/client generic enterprise storage and data processing architecture, such as an architecture operated by a business process outsourcing organization ("BPO"), which includes multiple disparate/heterogeneous data sources, having disparate formats and access methodologies, storing and processing customer/client specific data for multiple customers, while also permitting similarly transparent access across the enterprise storage architecture, e.g. across multiple customers/clients, such as for BPO-internal processing and reporting requirements. The data stored in the data sources may include data collected/received from the customer of the BPO, such as data identifying the BPO's customer's customers/clients and/or business processing rules or algorithms, data received/collected from the customers/clients of the BPO's customer, such as transactional data, e.g. insurance claims, etc., data calculated or computed by the BPO based on stored or collected data, data representative of business processing rules developed by the BPO, such as rules for maintaining customer specific service level agreements, or combinations thereof.

29 Claims, 5 Drawing Sheets

(56) References Cited

U.S. PATENT DOCUMENTS

| | | |
|---|---|---|
| 2006/0173873 A1 | 8/2006 | Prompt et al. |
| 2006/0268871 A1* | 11/2006 | Van Zijst ................... 370/390 |
| 2006/0287890 A1* | 12/2006 | Stead et al. ................... 705/3 |
| 2007/0016596 A1 | 1/2007 | Fabret et al. |
| 2008/0154844 A1* | 6/2008 | Gao et al. ................... 707/2 |
| 2009/0006348 A1 | 1/2009 | Gilula |
| 2009/0187525 A1* | 7/2009 | Agrawal et al. ............... 706/50 |
| 2010/0082671 A1* | 4/2010 | Li et al. ................... 707/770 |

* cited by examiner

REPACKAGEABLE VIRTUALIZED TRANSPARENT ACCESS TO HETEROGENEOUS DATA SOURCES

BACKGROUND

Business processes are the activities performed by companies, or other entities engaged in business activities, to achieve business goals. Business processes often include information technology ("IT") related activities related to the storage, management, processing, maintenance of, and access to, data generated, collected and stored in the course of conducting business operations, such as customer records, inventory records, marketing and forecasting data, accounting data and other data related to the operations of the particular business, such as the business rules applied to the processing of such data. Business process outsourcing refers to the delegation of management and operational responsibility for an IT-enabled, or other, business function, or process area, to an external services provider, such as via a long term contractual arrangement. Business process outsourcing may include the outsourcing of some or all of a company's business processes to a third party so as to reduce the costs of implementation, operation, etc. by leveraging the third party's common infrastructure that it provides or otherwise uses to service multiple different customers.

For example, in the health care industry, large health insurance companies may outsource the management and processing of insurance claims filed by members of the health plans operated by those health insurance companies, as well as the storage and maintenance of the records thereof. Third party companies, such as DST Health Solutions, Inc., located in Birmingham, Ala., referred to as a business process outsourcing organization ("BPO"), act as an intermediary receiving and processing claims and storing and maintaining data related thereto, typically subject to one or more service level agreements ("SLA").

Outsourcing of business processes, however, can create logistical and operational issues for the companies whose processes have been outsourced, referred to as the "outsourcing" company or organization. Ideally, the outsourced business processes integrate seamlessly with those business processes still retained by the outsourcing company. For example, ideally the outsourcing company's management is able to perform analysis and generate reports based on data, or otherwise access and update/modify data, maintained, or processing rules applied, by the BPO, in the same manner in which they could achieve such access, perform such analysis, updates/modifications or generate such reports if the data were still maintained internally by the outsourcing company. In other words, ideally the use of a BPO is transparent to the outsourcing company. However, a BPO's implementation of a business process is often developed independently of the outsourcing company and is often implemented using multiple proprietary or otherwise incompatible architectures which may be different than the outsourcing company's implementation of that process, or otherwise easily integrated with other processes of the outsourcing company. This may be further complicated by the BPO's own use of legacy technologies and haphazard implementation of newer technologies, as well as the need to support the BPO's own internal business processes.

Further, as was noted above, BPO's often undertake the implementation of similar out-sourced business processes for multiple companies/customers for the sake of cost savings. Accordingly, these BPO's often must internally standardize, i.e. leverage, their implementation of a given business process, as well as the supporting data storage architecture, to efficiently serve multiple customers and meet the terms of the SLA's, while being able to provide customized and substantially transparent access, i.e. the appearance of a customer-centric system, to the business process for each of the BPO's customers, as well as support the BPO's own internal business processes used to operate their outsourcing business. This level of technical standardization often results in inconsistencies that force the use of manual compensation processes which increases costs and reduces transparency.

In the particular area of data storage, e.g. the management of data sources and access thereto, maintaining a substantially standardized data storage architecture for all of a given BPO's customers while providing transparent customer-customized access, results in a complicated and often somewhat manually operated system. This is further complicated by the complexity of the BPO's internal architecture which may involve numerous disparate/heterogeneous data sources, including legacy systems, which may have evolved at different rates over time, storing data in different formats and with different requirements. Accessing this data on behalf of a particular customer, for example, may require an operator to manually access the various disparate resources which store the customer's data, manually interpret and aggregate the data and provide the aggregate to the customer. Facilitating the storage of new data and/or updates to the stored data by a particular customer may require the operator to manually translate and segregate the updates to the appropriate data repositories within the BPO's storage architecture.

Where the storage architecture of a BPO consists of homogeneous data sources, a "view" may be used to provide customer specific access to those data sources. In database theory, a view consists of a stored query accessible as a virtual table which is composed of the result set of a query. Unlike ordinary tables (base tables) in a relational database, a view does not form part of the physical schema, i.e. the database's logical and physical structure definition: it is a dynamic, virtual table computed or collated from data in the database. Changing the data in a table alters the data shown in subsequent invocations of the view. Views can provide advantages over tables: Views can represent a subset of the data contained in a table; Views can join and simplify multiple tables into a single virtual table; Views can act as aggregated tables, where the database engine aggregates data (sum, average etc) and presents the calculated results as part of the data; Views can hide the complexity of data, for example a view could appear as Sales2000 or Sales2001, transparently partitioning the actual underlying table; Views take very little space to store, the database contains only the definition of a view, not a copy of all the data it presents; Depending on the SQL engine used, views can provide extra security; and Views can limit the degree of exposure of a table or tables to the outer world.

However, views, as described above, are incapable of providing access to a storage architecture which includes disparate/heterogeneous data sources, including legacy systems, storing data in different formats and with different requirements. In such implementations, automated interfaces may be provided allowing the customer to access their own data but such interfaces are complex and often require that customer specific databases, i.e. replicated databases, be created ahead of time from periodic extractions from the central data sources. These periodically replicated databases create coherency issues such as ensuring that the customer has access to the most up to date information maintained by the BPO and that the BPO has timely access to any updates provided by the customer.

DETAILED DESCRIPTION OF THE DRAWINGS AND PRESENTLY PREFERRED EMBODIMENTS

By way of introduction, a transparent data access interface/layer for repackageable virtualized transparent access to heterogeneous data sources, such as internally maintained or outsourced business process data sources, is disclosed. In one embodiment, this data access interface provides substantially real time customer/client specific, i.e. transparent, access to a customer/client generic enterprise storage and data processing architecture, such as an architecture operated by a business process outsourcing organization ("BPO"), which includes multiple disparate/heterogeneous data sources, having disparate formats and access methodologies, storing and processing customer/client specific data for multiple customers, while also permitting similarly transparent access across the enterprise storage architecture, e.g. across multiple customers/clients, such as for BPO-internal processing and reporting requirements. The data stored in the data sources may include data collected/received from the customer of the BPO, such as data identifying the BPO's customer's customers/clients and/or business processing rules or algorithms, data received/collected from the customers/clients of the BPO's customer, such as transactional data, e.g. insurance claims, etc., data calculated or computed by the BPO based on stored or collected data, data representative of business processing rules developed by the BPO, such as rules for maintaining customer specific service level agreements ("SLA"), or combinations thereof.

Exemplary data sources include data repositories and data management systems such as relational and flat file databases, computer program specific data files, such as Microsoft Access® databases, Microsoft Excel® spreadsheet files, Microsoft Word® document files, generic data files, such as text files, etc. Other exemplary data sources include proprietary data sources such as Amisys Advance™, MHC™ PowerMHST™ and PowerSTEPPT™ manufactured by DST Health Solutions, Inc., located in Birmingham, Ala. Other exemplary data sources include non-proprietary commercial data sources such as SalesLogix manufactured by The Sage Group, PLC, located in London, UK, Clarity manufactured by CA, Inc., located in Islandia, N.Y., PeopleSoft manufactured by Oracle, Inc., located in Pleasanton, Calif., Jira published by Atlassian Software Systems, located in Sydney, AU, and LexisNexis, published by LexisNexis, Inc., located in Dayton, Ohio.

In one embodiment, the transparent data access layer is associated with a data source identification processor which maintains a directory, aka a clearinghouse, of the locations of customer/client specific information as stored within the enterprise architecture, or to where such information should be stored. Queries, such as a customer/client specific query and/or store/update request, or generic queries/updates across multiple customers/clients, are received and processed by the data source identification processor which then uses the directory to determine the location(s) of, and in one embodiment, the method of access to, the requisite data and generates queries or store/update operations substantially in parallel to all, or a subset, of the one or more particular data sources which maintain the customer/client specific information. These queries or store/update operations may be generated substantially in parallel and/or substantially in real time with respect to the receipt of the initial request for a query or store/update operation. As used herein, a database operation or request refers to a query to retrieve data stored in a database which meets criteria specified in the query, storage of new data, updates to existing data, or combinations thereof.

The data source identification processor, in one embodiment, further maintains data regarding the access methodologies and data formats of the various data repositories within the enterprise storage architecture such that the database operations, i.e. the queries and/or store/update operations, are properly generated with respect thereto. In one embodiment, responses to database operations, e.g. queries, are received and transformed by the data source identification processor to augment each returned record with a customer/client specific identifier which facilitates further processing, such as transformation, aggregation and/or augmentation, i.e. repackaging, of the records with respect to, or among multiple, client/customers. The transparent data access layer permits a BPO to provide substantially real time transparent access to customers similar to the type of access those customers enjoyed prior to outsourcing their business process, independent of the underlying data source used by the BPO. Thereby, truly effective business process outsourcing, e.g. wherein the vendor and the customer are able to work in tandem, making synergistic business decisions using the same view of real-time data, may be provided.

Heterogeneous data sources refers to data sources characterized by technical, data model and/or semantic heterogeneity. Technical heterogeneity, also referred to as syntactic heterogeneity from the point of view of data, refers to data sources with different file formats, access protocols, query languages etc. Data model heterogeneity, also referred to as schematic heterogeneity, refers to data sources which utilize different ways of representing and storing the same data, e.g. table decompositions may vary, column names (data labels) may be different (but have the same semantics), data encoding schemes may vary (i.e. should a measurement scale be explicitly included in a field or should it be implied elsewhere). Semantic heterogeneity occurs where data across constituent databases may be related but different.

In one embodiment, an interface, referred to as a "virtual table," is provided for each specific customer of the BPO, the virtual table appearing to be a fully accessible database table, or other data structure, containing only customer specific data records. Similar to a "view," the virtual table calculates or otherwise provides results substantially in real time, i.e. at the time of the query. In one embodiment, the virtual table may provide for persistent or cached operation to improve performance, with appropriate management processes in place to ensure data coherency with respect to the underlying data sources. In one embodiment, the virtual table is implemented as a bidirectional interface which receives requests, e.g. data queries and/or store/update operations, from a specific customer, augments those queries or store/update operations to include an identifier of the specific customer and forwards the augmented queries or store/update operations to a request transformation processor which, as will be described, includes a data source identification processor. The data source identification processor, as described above, uses the identifier to determine the appropriate data repositories to which the queries/stores/updates should be directed and then sends one or more queries or store/update operations to those appropriate data repositories, as described above. The records received in response to the request(s), if any, are transformed, aggregated, augmented or otherwise appropriately packaged and forwarded to the virtual table which may remove the customer specific identifier and present/package the records to the customer in response to the initial request, as if they were retrieved from one or more customer specific tables in one or more customer specific databases. Alternatively, the records obtained from the various data repositories may be forwarded to the virtual table where they are aggregated and presented to the customer as a database independent of the underlying data source type, e.g. database, spreadsheet, text file, etc. Access for new customers may be easily provided by simply creating a new virtual table associated with the new customer. Similarly, a virtual table may be easily modified to accommodate a customer who wishes to modify the form or content of the data they have access to. Virtual tables further permit a customer to couple their own business intelligence software to the data repositories of the BPO, or otherwise further manipulate the data, so as to be able to substantially directly update or add new records or extract and analyze data according to their own requirements, in substantially real time or in batch. Virtual tables may be accessible directly by the customer, such as via a Java Database Connectivity ("JDBC") connection or via web services, i.e., software systems designed to support interoperable machine-to-machine interaction over a network such as the Internet. Virtual tables may have customized access controls, security schemes, etc.

While the transparency achieved by the disclosed embodiments creates more onerous requirements for the BPO to maintain more strict controls over their data, as any errors would be more directly visible to the customer, such transparency provides more economical and efficient access to the customer and ultimately reduces the burden on the BPO in complying with customer-specific requirements. Further, the disclosed embodiments eliminate the need for human intervention to provide customer data access, thereby reducing administrative overhead, improving efficiency and minimizing errors.

While the disclosed system will be described with reference to a specific customer which interacts with a BPO which services multiple customers, i.e. an intra-BPO virtual table, it will be appreciated that the underlying multiple disparate databases may, instead, be owned or maintained by different BPO's, whereby the disclosed virtual table permits a given outsourcing entity to easily access an aggregate of data maintained across the different, multiple BPO's, i.e. an inter-BPO virtual table, each of which may internally implement an intra-BPO virtual table with respect to their internal disparate data sources. In one embodiment, an inter-BPO table may be utilized by governmental or regulatory entity to facilitate data access to multiple vendor BPO's. Further, the disclosed virtual table may be implemented within a given outsourcing company, i.e. a hybrid company-BPO virtual table, so as to integrate access to outsourced data maintained by a BPO with data related to internally maintained business processes, thereby providing transparent access across both internal and outsourced processes. It will be appreciated that any combination of intra, inter and hybrid company-BPO virtual tables may be implemented.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 1:
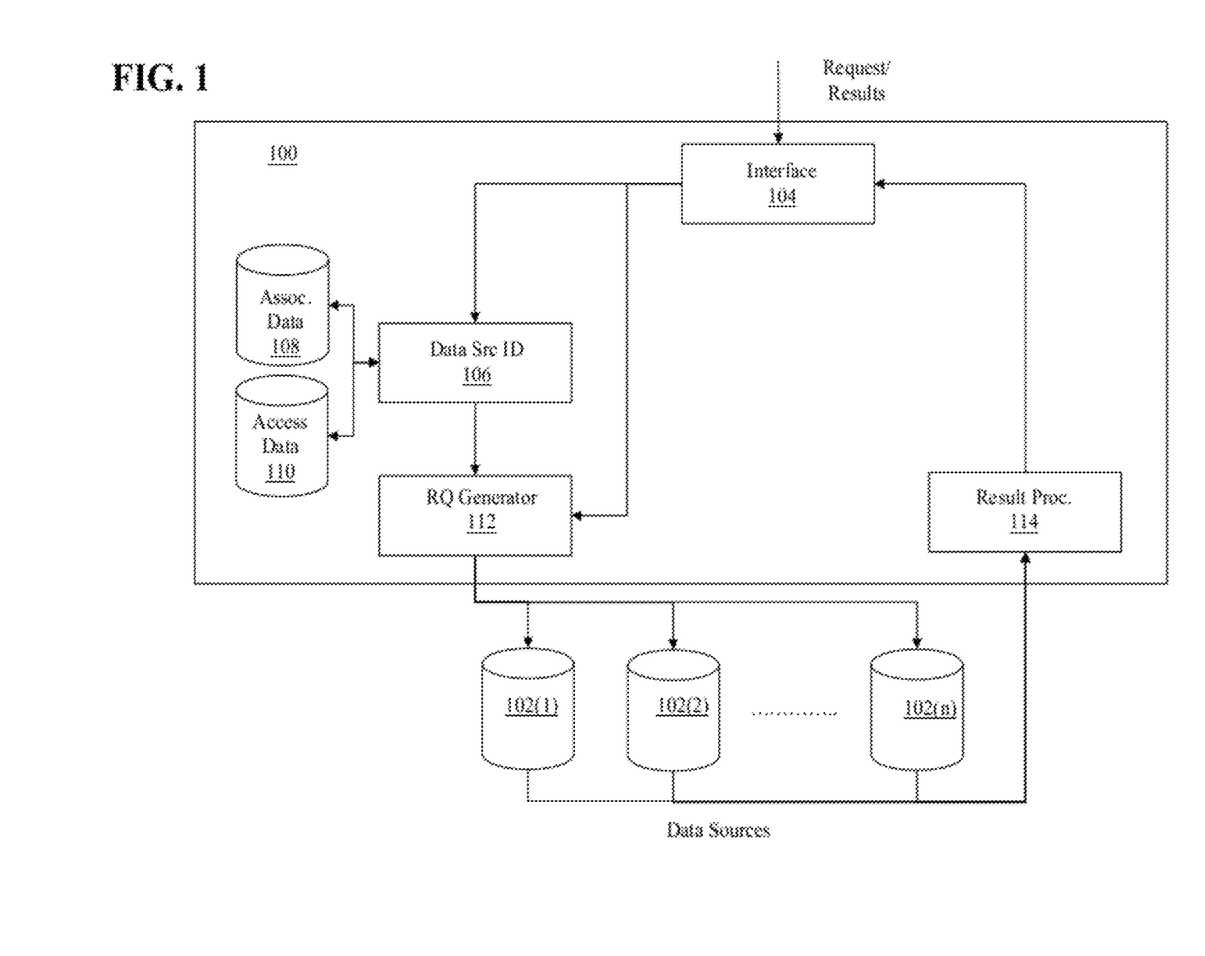
FIG. 1 depicts a block diagram of an exemplary system for providing a transparent data access interface/layer for repackageable virtualized transparent access to heterogeneous data sources according to one embodiment.

FIG. 1 depicts a block diagram of an exemplary system 100 for providing a transparent data access interface/layer for repackageable virtualized transparent access to heterogeneous data sources 102, such as business process data sources 102, according to one embodiment, wherein at least two or more of the heterogeneous data sources 102 are characterized by a heterogeneity different from a heterogeneity of at least one other of the heterogeneous data sources 102. The heterogeneous data sources 102 are operative to store a plurality of data items, each of the plurality of data items being associated with at least one of a plurality of entities (not shown). In one embodiment, the heterogeneity of each of the plurality of heterogeneous data sources 102 comprises at least one of file format, access protocol, query language, data representation, inter-data source relationship, or combinations thereof. In one embodiment, each of the plurality of heterogeneous data sources 102 is operative to store at least one of the plurality of data items.

The disclosed system 100 includes a data source identification processor 106 operative to store association data representative of at least an association between each of the plurality of entities and each of the plurality of heterogeneous data sources 102, the data source identification processor 106 being further operative to store access data representative of the heterogeneity of each of the plurality of heterogeneous data sources 102. The association data and access data may be stored in databases 108, 110. In one embodiment, the association data is further representative of an association between each of the plurality of entities and each of the plurality of data items and in which each of the plurality of heterogeneous data sources 102, each of the plurality of data items is stored. In one embodiment, at least one of the plurality of heterogeneous data sources 102 is operated by an entity different from another entity which operates another of the plurality of heterogeneous data sources 102. It will be appreciated that the data source identification processor 106 and the plurality of heterogeneous data sources 102 may be operated by the same entity or different entities depending upon the implementation.

The system 100 further includes a request interface 104 operative to receive a request from a requestor, such as a customer of a BPO or an internal requestor of the BPO, wherein the request specifies an operation associated with at least one of the plurality of entities. In one embodiment, the operation may included one of a read operation, a store operation, an update operation or a combination thereof. The operation may further specify a subset of the plurality of data items associated with the at least one of the plurality of entities with respect to which the operation is to be performed.

The data source identification processor 106 is coupled with the request interface 104 and receives the request from the request interface 104. Herein, the phrase "coupled with" is defined to mean directly connected to or indirectly connected through one or more intermediate components. Such intermediate components may include both hardware and software based components. The data source identification processor 106 is further operative to access the association data and the access data databases 108, 110, based on the at least one of the plurality of entities associated with the first operation, to determine in which data sources 102 the requisite data is stored and how to access that data.

In one embodiment, the system 100 may further include an interface associated with a first entity of the plurality of entities, such as a virtual database table or web interface perceived as being specific to the first entity. The interface is operative to receive the request from the requestor, wherein the request need not identify the first entity, such that the interface associates the first entity with the request based on receipt of the request via the interface and the association of the first entity with the interface.

As described above, the data source identification processor 106 is coupled with the request interface 104 and further operative, based on the specified at least one of the plurality of entities, to determine a subset of the plurality of heterogeneous data sources 102 to which the first operation should be performed and the heterogeneity of each of the determined subset of heterogeneous data sources 102. This information may be stored in the Association and Access data databases which may be further queried based on the identity of the requestor. In one embodiment, the determined subset of the plurality of heterogeneous data sources 102 may include all of the plurality of heterogeneous data sources 102.

The system 100 further includes a request generator 112 coupled with the data source identification processor 106 and operative to generate and send a data source request to each of the determined subset of the plurality of heterogeneous data sources 102. Each data source request may be generated based on the heterogeneity of the data source 102 to which it is being sent and further specifies the first operation to be performed. In one embodiment, each of the data source requests are sent substantially simultaneously.

The system 100 further includes a result processor 114 operative to receive, in response to the sending of the requests, at least one result of the performance of the first operation from at least one of the determined subset of the heterogeneous data sources 102, the result processor 114 being further operative to augment each of the received at least one result with an identifier which identifies the entity of the specified at least one of the plurality of entities associated therewith, and provide the augmented at least one result to the requestor, such as via the request interface 104. The at least one result may include data gathered in response to the query, such as business process data or rules, data computed in response to the query, confirmation of a store or update operation, etc. or combinations thereof. In one embodiment, the result processor 114 may be further operative to homogenize each of the at least one result, prior to the provision of the augmented at least one result, to remove the heterogeneity of the at least one of the determined subset of the heterogeneous data sources 102 from which the at least one result was received. In one embodiment, the first request may further specify the first operation associated with at least first and second entities of the plurality of entities, the result processor 114 being further operative to provide only the augmented at least one result associated with the first entity to the requestor.

It will be appreciated that the system 100 may be implemented in hardware, software or a combination thereof, and that one or more of the components thereof may be combined or, alternatively, sub-divided into other functional units, to implement the described functionality, as further described below with respect to FIG. 4. Further, the system 100 may include other components which are not shown. In one embodiment, in computer program logic stored in a memory device, such as a computer memory or computer storage device, and executable by one or more processors to implement the described functionality. For example, the described functionality may be implemented on a web server as one or more network accessible web pages coupled with suitable back-end logic.

In one embodiment, a system 100 for providing access to a plurality of heterogeneous data sources, each of the plurality of heterogeneous data sources characterized by a heterogeneity different from a heterogeneity of at least one other of the plurality of heterogeneous data sources, the plurality of heterogeneous data sources being operative to store a plurality of data items, each of the plurality of data items being associated with at least one of a plurality of entities, includes a processor and a memory coupled with the processor.

The system 100 further includes: first logic stored in the memory and executable by the processor to store association data representative of at least an association between each of the plurality of entities and each of the plurality of heterogeneous data sources, the first logic being further executable by the processor to store access data representative of the heterogeneity of each of the plurality of heterogeneous data sources; second logic stored in the memory and executable by the processor to receive a first request from a requestor wherein the first request specifies a first operation associated with at least one of the plurality of entities; the first logic being coupled with the second logic, the first logic being further operative to, based on the specified at least one of the plurality of entities, determine a subset of the plurality of heterogeneous data sources to which the first operation should be performed and the heterogeneity of each of the determined subset of heterogeneous data sources.

The system 100 further includes third logic stored in the memory and executable by the processor to generate and send a data source request to each of the determined subset of the plurality of heterogeneous data sources, each data source request being generated based on the heterogeneity of the data source to which it is being sent and specifying the first operation to be performed; and fourth logic stored in the memory and executable by the processor to receive, in response to the sending, at least one result of the performance of the first operation from at least one of the determined subset of the heterogeneous data sources, the fourth logic being further executable by the processor to augment each of the received at least one result with an identifier which identifies the entity of the specified at least one of the plurality of entities associated therewith, and provide the augmented at least one result to the requestor.

Figure 2:
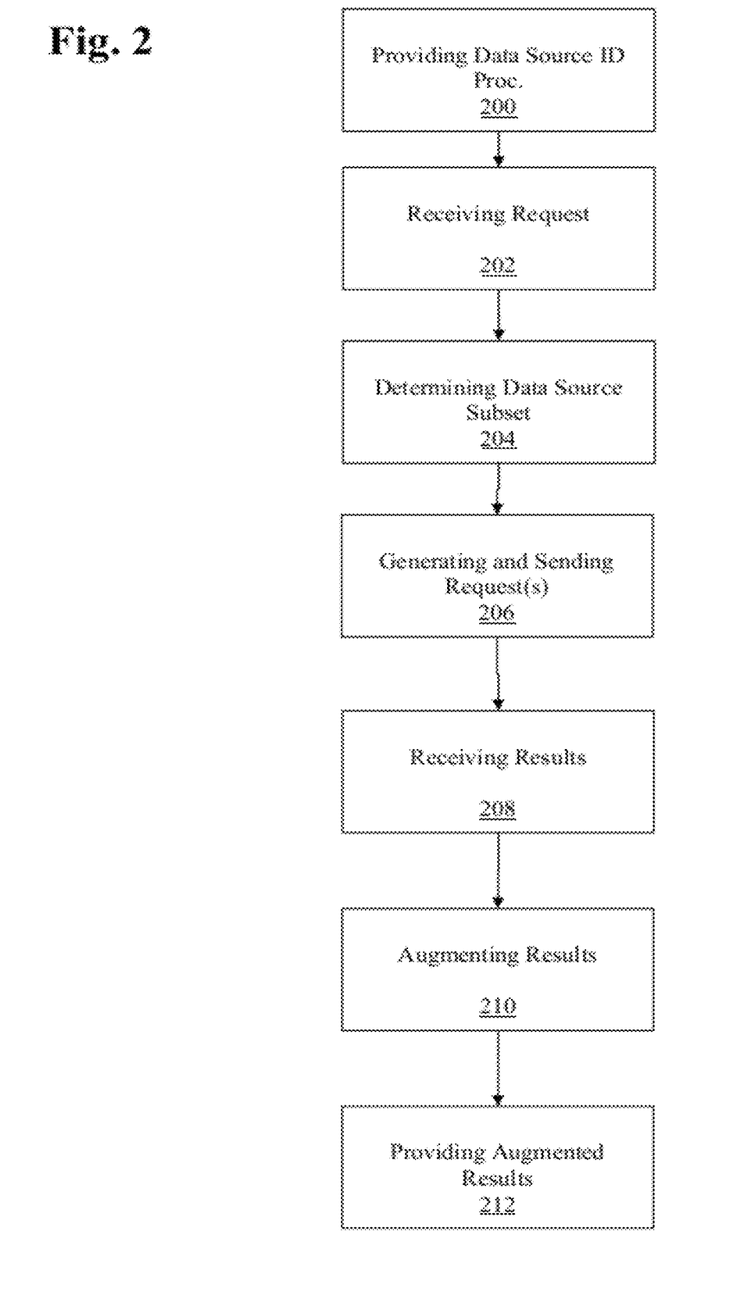
FIG. 2 depicts a flow chart showing exemplary operation of the system of FIG. 1.

FIG. 2 depicts a flow chart showing exemplary operation of the system 100 of FIG. 1 for accessing a plurality of heterogeneous data sources 102, each of the plurality of heterogeneous data sources characterized by a heterogeneity different from a heterogeneity of at least one other of the plurality of heterogeneous data sources 102, the plurality of heterogeneous data sources 102 being operative to store a plurality of data items, each of the plurality of data items being associated with at least one of a plurality of entities. In one embodiment, the heterogeneity of each of the plurality of heterogeneous data sources 102 may include at least one of file format, access protocol, query language, data representation, inter-data source relationship, or combinations thereof. In one embodiment, each of the plurality of heterogeneous data sources 102 may be operative to store at least one of the plurality of data items.

The operation includes: providing a data source identification processor 106 operative to store association data representative of at least an association between each of the plurality of entities and each of the plurality of heterogeneous data sources 102, the data source identification processor 106 being further operative to store access data representative of the heterogeneity of each of the plurality of heterogeneous data sources 102 (block 200). In one embodiment, the association data may be further representative of an association between each of the plurality of entities and each of the plurality of data items and in which each of the plurality of heterogeneous data sources 102 each of the plurality of data items is stored. In one embodiment, at least one of the plurality of heterogeneous data sources 102 may be operated by an entity different from another entity which operates another of the plurality of heterogeneous data sources 102. In one embodiment, the data source identification processor 106 and the plurality of heterogeneous data sources 102 may be operated by the same entity.

Operation of the system 100 further includes: receiving a first request from a requestor specifying a first operation associated with at least one of the plurality of entities (block 202). In one embodiment, the first operation may include one of a read operation, a store operation, an update operation or a combination thereof. In one embodiment, the first operation may further specify a subset of the plurality of data items associated with the at least one of the plurality of entities with respect to which the first operation is to be performed.

In one embodiment, operation of the system 100 may further include: providing a first interface associated with a first entity of the plurality of entities; receiving the first request via the first interface from the requestor, wherein the first request does not identify the first entity; and associating the first entity with the first request based on receipt of the first request via the first interface and the association of the first entity with the first interface. In this embodiment, the first interface may be perceived as a database table specific to the first entity.

Operation of the system 100 further includes: determining, by the data source identification processor 106, based on the specified at least one of the plurality of entities, a subset of the plurality of heterogeneous data sources 102 to which the first operation should be performed and the heterogeneity of each of the determined subset of heterogeneous data sources (block 204). In one embodiment, the determining may further include accessing the association data and the access data based on the at least one of the plurality of entities associated with the first operation. In one embodiment, the determined subset of the plurality of heterogeneous data sources 102 may include all of the plurality of heterogeneous data sources.

Operation of the system 100 further includes: generating and sending a data source request to each of the determined subset of the plurality of heterogeneous data sources 102, each data source request being generated based on the heterogeneity of the data source 102 to which it is being sent and specifying the first operation to be performed (block 206). In one embodiment, each of the data source requests may be sent substantially simultaneously.

Operation of the system 100 further includes: receiving, in response to the sending, at least one result of the performance of the first operation from at least one of the determined subset of the heterogeneous data sources (block 208); and augmenting each of the received at least one result with an identifier which identifies the entity of the specified at least one of the plurality of entities associated therewith (block 210). In one embodiment, the augmenting may further include homogenizing each of the at least one result prior to the providing to remove the heterogeneity of the at least one of the determined subset of the heterogeneous data sources from which the at least one result was received.

Operation of the system 100 further includes: providing the augmented at least one result to the requestor (block 212). In one embodiment, the first request may further specify the first operation associated with at least first and second entities of the plurality of entities, the providing further comprising providing only the augmented at least one result associated with the first entity to the requestor.

Figure 3A:
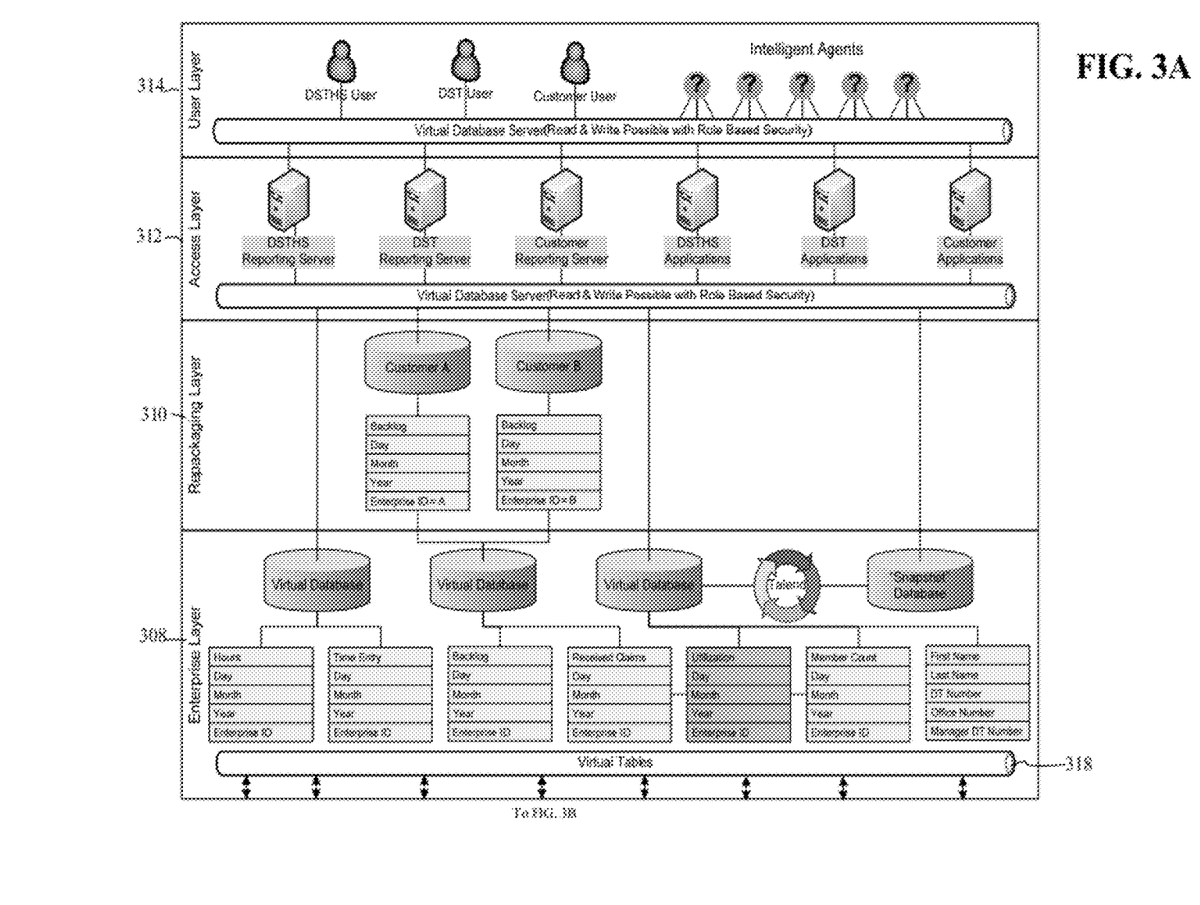
FIGS. 3A and 3B depict a block diagram showing an exemplary logical implementation of the system of FIG. 1.
Figure 3B:
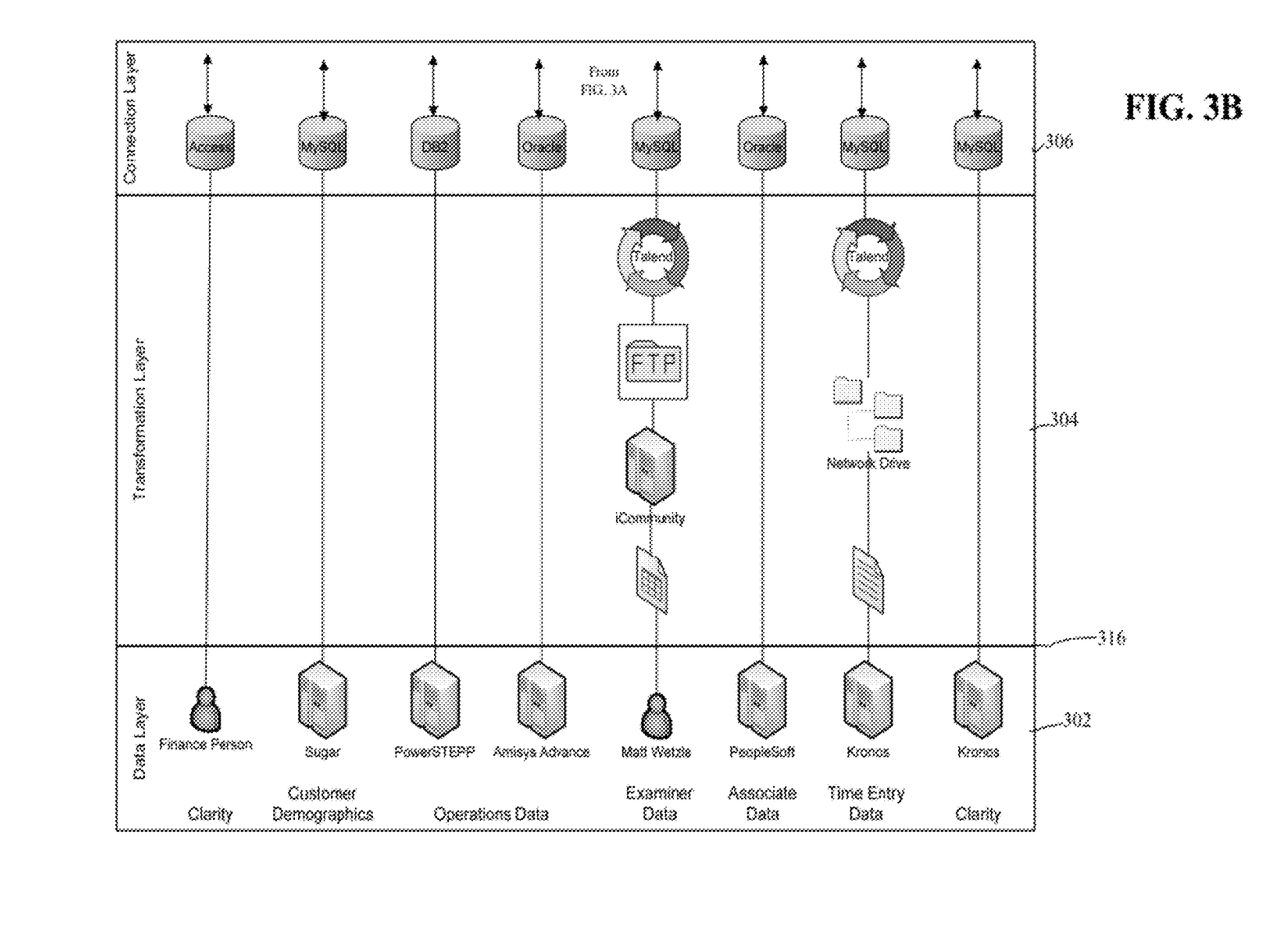

FIGS. 3A and 3B depict a block diagram showing an exemplary logical implementation of the system of FIG. 1. This logical implementation may include a set of logical software and/or hardware layers of an Enterprise Data Services Platform architecture 300 and may include a data layer 302, a transformation layer 304, a connection layer 306, an enterprise layer 308, a repackaging layer 310, an access layer 312, and a user layer 314. It will be appreciated that the depicted layers and their arrangement are exemplary and are implementation dependent. In particular, alternative embodiments may include fewer or additional layers, e.g. one or more of the depicted layers may be combined into a single layer, a depicted layer may be further separated into sub-layers and/or additional layers may be added or substituted for depicted layers.

The Data Layer 302 may represent some or all of the various heterogeneous data sources 102 utilized throughout the BPO's organization and may include one or more of the following:

Manually maintained data, such as spreadsheets, Microsoft Access databases, or flat files. Typically these data sources include information that is managed outside of any one system but is typically used in combination with information extracted from a system;

Operational System Databases which are used to deliver some value to clients directly. These systems typically produce large volumes of transactional data. Examples of operational systems include claims systems, correspondence management systems, etc.;

Business Application Databases which include those systems required to run the business, providing direct value to business users but not to customers. These systems typically produce large volumes of data as well, but not as large as operational systems. Examples of business applications include finance systems, customer care systems, etc.;

File Extracts—In many cases, direct access to the database of a business or operational system is restricted or there may not be a "real" database to access. Such systems often provide an alternative method of pulling data out of them in the form of a "file extract" or a flat file where the extracted data is in columnar form that can be parsed out. Examples of such applications include telephonic systems; and External data—This is typically XML information that comes in through web services. Examples include Google News, or information from Lexus Nexus.

The Transformation Layer 304, also referred to as the slow caching layer, converts manually maintained data and file extracts into relational databases. It may be used to improve performance of slow performing data sources, e.g. Excel spreadsheets. In one embodiment, data integration software, such as the Talend Integration Suite, published by Talend, Inc., located in Los Altos, Calif., may be used. Use of the transformation layer may be minimized, such as only when performance would be impacted were it not used or the data is stored someplace that is technically unreachable directly by the connection layer. Performance may be impacted when the manually maintained data is sufficiently large because the manually maintained data has no "access smarts" in the way that a database does. Data that is technically unreachable is often behind a firewall or some other technology that prevents direct access. Reliance on the transformation layer may impact real-time accessibility and introduce synchronization issues and race conditions, etc. Therefore this layer my only be refreshed when a data source is updated. In one embodiment, the transformation layer 304 operates in non-real-time to convert manually maintained data or file extracts to relational databases which may be utilized in accordance with the methodologies and system described herein. In an alternative embodiment, real-time conversion may be provided and may be implementation and/or performance dependent.

In the layers between the transformation layer and the user layer, data is not maintained but is instead pulled in real-time from the data source or interim data files maintained in the transformation layer.

The Connection Layer 306 defines the details of how to pull data out of source systems, i.e. the data layer 302 or transformation layer 304. Each of the data sources in the data layer 302 may require a specific communication protocol in order to pull needed data from them. In the case of different databases that use different SQL variants, a common SQL language must be converted in to a form that each of the source databases can understand. In the case of an XML file or Excel spreadsheet, that common SQL language must be converted into file manipulations that can draw the needed information out in a standardized way. The connection layer knows only how to talk to data sources but not what information to pull. It essentially translates standard SQL queries from the different layers into commands that the data sources 102 understand. If one data source is, for example, an Oracle database, the connection layer would translate the SQL query into an Oracle SQL calls.

There can be further variations when a common database is used as a data source but the data contained within that database is in some non-standard form, for example, date formats in COBOL systems that predate the year 2000. As a further example, prior to the "Y2K" or Millennium bug, date formats were stored in a two digit to save space. After the year 2000, developers applied a number of various techniques in order to modify the date to incorporate the additional information in ways that best suited individual systems. So, there can be two databases produced by the same vendor but with the date information stored in different ways. It is in the connection layer that allowances can be made for such circumstances.

In one embodiment, the connection layer accepts commands or queries in a standard format/protocol, such as SQL, and converts those commands/queries to requisite format/protocol for the particular data source to which the command/query is directed.

The Enterprise Layer 308, also referred to as the foundation layer, is where virtual layers are created on top of the source data available through the connection layer 306 via, in one embodiment, assignment of an ID unique to the entity associated with the data, e.g. an "enterprise ID". In the enterprise layer 308 tables are created using SQL that is translated into a form that the data sources in the data layer can understand by way of the connection layer 306. These tables bring together the data from the data layer in ways that will be in a convenient form for packaging and repackaging later on. As described elsewhere, the assignment of an entity unique identifier to each data item retrieved from a data source enables, for example, the retrieved data to be collected together for aggregate analysis and separated, as needed, for individual reporting.

A characteristic of the enterprise layer 308 is that all of the data tables are tagged with an enterprise ID that corresponds to the customer that the data relates to. This ID may be arbitrary but unique among the customers. These tables are then bundled up in to virtual databases. These databases may have role level security and may look just like a real database. Applications may connect to them as though they were a real database through a JDBC connector. Applications may also interact with these s through web-services. The virtual tables and databases which comprise them look and respond like standard databases and tables, however, they actually receive commands/request/queries and process them in real time.

In one embodiment, the Enterprise Information Integration product, published by Metamatrix, Inc., a subsidiary of Red Hat, Inc. located in Raleigh, N.C., is utilized to build a virtual foundation on top of the source data available through the connection layer 306. Tables are created using SQL that the Metamatrix software translates into a form (format and/or protocol) that the data sources 302 in the data layer can understand by way of the connection layer 306. These tables bring together the data from the data layer in ways that will be in a convenient form for packaging and repackaging later on. A characteristic of the enterprise layer 308 is that all the data tables are tagged with an enterprise ID that corresponds to the customer that the data relates to. As described elsewhere, this ID is arbitrary but unique. The enterprise ID is like the locking puzzle piece between all of the data pulled from the data sources 302 in the data layer 302 creating a unified landscape of data.

The Repackaging Layer 310 is where data in the tables defined in the enterprise layer may be repackaged for some specific use. We can then use this enterprise ID later on when creating sets of data from across all data sources. For example, we can create sets of data for all data with an enterprise ID for customers that have "Blue Cross" in their name. Or we can create a customer specific set of data where the enterprise ID is specific to some customer. Once we have these data sets defined, we can then package them up in to use specific virtual databases available through the access layer 312.

In one embodiment, the repackaging and enterprise layers interrogate, i.e. query and pull only data from, those sources containing data associated with the enterprise ID of interest, the sources being determined in real-time at the time of the query and, in at least one implementation, substantially in parallel. This minimizes bandwidth and utilization of data sources. Alternatively, all data source across all enterprise ID's may be accessed.

The Access Layer 312 is where applications connect to virtual databases, such as via application program interfaces ("API's"). As mentioned, there is role level security on each virtual database ensuring that the "use specific" and "enterprise" virtual databases are accessed only by those applications with permission to do so. The different access methods include JDBC connections and web services. The virtual databases can be configured to both read from and write to so they can be used as a data abstraction layer to support application integration. Reporting engines, business intelligence applications, and complex event processors can also connect to these virtual databases in a read-only mode. In one embodiment, the complex event processor is used to scan all of the emancipated data for patterns that would typically require a human staring at reports. In this way substantially all of the data can be examined substantially all of the time as opposed to analysis of sample subsets thereof. In one embodiment, the complex event processor is implemented using Esper Enterprise Edition, Enterprise ready Event Processing and CEP platform, published by EsperTech Inc., located in Wayne, N.J.

The access layer is where applications connect to virtual databases served up by the repackaging layer. As mentioned, there is role level security on each virtual database that can drive all the way down to an individual field ensuring that the proper credentials are required for even the most granular level of data. The different access methods include encrypted JDBC connections and web services over https. The virtual databases can be configured to both read from and write to so they can be used as a data abstraction layer to support application integration. Reporting engines and business intelligence applications can also connect to these virtual databases in a read-only mode for customers that have their own reporting and business intelligence solutions and are not interested in our low cost alternative.

As described elsewhere, in one embodiment, client specific interfaces can be implemented, such as a client specific web portal, for entering queries and providing results. This interface may be designed to append the customer's specific enterprise ID automatically to all queries sent through the system, thereby limiting the data that the customer can retrieve to only that data that belongs to them. In this way, customer specific virtual tables can be easily deployed.

The User Layer 314 is where end users can access the data through reporting engines, database interrogation tools, etc. In one embodiment, intelligent agents may be configured to utilize the user layer 314 to automatically monitor the data in the various virtual databases to look for characteristics of the data that might warrant a closer examination by a person.

The described virtual normalization/homogenization of heterogeneously stored data via command/query transformation coupled with a real time reciprocal data transformation from heterogeneous to homogeneous form, may be extended to support additional alternative or incremental functionality. For example, as was described above, in one embodiment, the underlying heterogeneous data includes business rules, either specific to an organization or generic across multiple organizations.

In one embodiment, a business rules engine is provided which can retrieve customer specific or customer generic business rules stored in the data sources, as described above, and apply those rules to generate data such as reports, monitor business processes, such as in support of one or more SLA's, or combinations thereof. Generic business rule packages may be provided by the BPO and provided to customers on a subscription basis, a one time use basis or other basis. For example, customers of the BPO can subscribe to a broad array of pre-defined rule sets from a Rules Catalog including rules around:

1. Fraud and abuse detection—For example, rules may be implemented to look for patterns of fraud or abuse, such as multiple amputations to the same limb, a hysterectomy performed on a man, or any procedure that should follow another but the first procedure was not found.
2. Fiscal intervention—For example, rules may be implemented to look for patterns of claims that may be indicative of a far more expensive procedure in the near future (e.g., cancer). Notification to the health plan customer may then be provided because such claims could drag on a health plan's financial outlook.
3. Operational intervention—For example, claims examiners are often incentivized by the number of claims they process in a day. However, when an examiner detects multiple claims that could be automatically processed they are typically required to notify a manager. Because it is not in their best interest to do so they will often just clear them all within a few seconds. Rules can be implemented which monitor these transactions and when patterns of claims processing evidencing processing of multiple claims within defined short period of time are detected, appropriate management may be notified.
4. Clinical intervention.—For example, claims data can be detected that indicates diabetes for a particular member but not followed up by a prescription for insulin.

Custom rule sets can also be implemented that embody customer specific competitive and regulatory environments. Alternatively, the necessary rules development tools may be provided to customers, for fee or not, so that they can develop their own rule sets.

An integrated business rules engine further permits monitoring of data as often as desired. Accordingly, data that may have been audited manually weekly or monthly can be automated hourly or as often as necessary. This may permit, for example, productivity issues to be identified as they happen, enabling supervisors to remediate immediately, or fraud and abuse patterns to be identified within minutes versus days after the fact.

The above described embodiments further permit collective access to data across customers while maintaining the capability to segregate that data, or reports or computations based thereon, based on the customer identifier augmented to the data base operation results. This permits the BPO or any one customer to benefit for inferences and extrapolations which can be made, or improved, via the addition of additional data of the BPO's other customers without compromising the confidential or proprietary integrity of the data.

For example, let's say a client outsourced some lines of business to DST Health Solutions but kept others. Now they want to automatically calculate the productivity of the claims examiners. To do this, time-card data from the customer human resources system may be integrated and combines with the total number of claims per day per examiner. The rules engine can then be directed to look for productivity problems with the customer's claims examiners (e.g., clocking out early to make their productivity numbers look better, processing claims during "down time," etc.). Of course, customers can also integrate other systems in to our solution that have absolutely nothing to do with claims, enabling them to become masters of all the data in their organization.

This disclosed embodiments may be deployed as a hosted service where clients can access data services via, for example, the web, an appliance, i.e. a combined hardware and software solution installed in the BPO or customer data center, or in a "direct connect" implementation of either a hosted service or appliance where clients connect their applications directly to the syndication layer, described above, of disclosed embodiments for either the hosted or appliance models.

In a hosted implementation, the disclosed embodiments would be hosted as a service serving multiple clients. The disclosed reporting solution enables a single instance of the software to be operated but configured for any number of clients. The reporting solution can be branded to look like portals used inside the customer's environment to create the appearance of complete transparency. When the customer logs in for the first time they must provide credentials to identify and authenticate themselves to the service locking them in to only the reports to which they have subscribed. This reporting solution provides role based security around all reports so that the site can be configured to support a large variety of users. The business rules engine also enables segregation of rules so that rules to which the client has subscribed can be run against that client's data.

With the appliance services version of the disclosed embodiments, customers could create models for their own internal operational and administrative data sources and integrate those in to their appliance using provided tools. They would also be able to create their own reports and rules.

For both the hosted solution and the appliance solution customers that already have a reporting or rules solution and aren't interested in our low cost alternatives can also be supported. Customers can easily connect their reporting solution to the data services provided by disclosed embodiments using standard communication protocols like JDBC and web services. This solution enables these customers to continue using their reporting solution without having to contend with another reporting solution.

Generally, applications of the disclosed embodiments include improved reporting, processing of complex events, improved forecasting and monitoring of service level agreements. The disclosed embodiments permit queries against the aggregate of all of the data stored for all of the BPO's customers while permitting segregation of the query results depending upon the goals of the query and the destination of the reports. This permits internal reports to be generated across multiple customers while further permitting the partitioning of those reports for customer specific purposes.

Complex event processing leverages the disclosed embodiments' ability to store business rules in addition to business data, thereby allowing a business rule processing engine the capability to retrieve and apply business rules across all customers, a subset of customers or a specific customer, to all data or a subset thereof, or customer specific data, and segregate and reports customer specific results. In addition, service level agreements may be parameterized and stored as business rules and processed in accordance therewith, across all customers for internal metrics, or on customer by customer basis to demonstrate compliance therewith or to comply with reporting requirements. Further, business rule packages can be designed and offered to one or more customers utilizing the disclosed embodiments to segregate their application to the data of subscribing customers.

Improved data forecasting may be provided which permits analytical tools to access data across customers looking for linear and non-linear patterns and/or anomalies and/or apply analytical results inter-customer rather than only intra-customer, while maintaining the capability to segregate results to specific customers to facilitate reporting while maintaining confidential data boundaries as between customers. Effectively, this provides larger pool of information for statistical analysis, improving the accuracy and value thereof, while protecting the underlying data from unauthorized exposure.

These applications of the disclosed embodiments may facilitate the implementation of advanced services such as pattern detection, such as for insurance claim fraud. Patterns of fraudulent activity may be detected for one or more customers and used to monitor for similar activity in customers that have yet to see such fraud. This may be used to contain the spread of activity affecting an entire business sector.

The disclosed embodiments may be implemented using synchronous software such as MetaMatrix Enterprise Data Services Platform Teiid, published by Red Hat, Inc., located in Raleigh, N.C. Teiid is a data virtualization system that allows applications to use data from multiple, heterogeneous data stores. Teiid is comprised of tools, components and services for creating and executing bi-directional data services. Through abstraction and federation, data is accessed and integrated in real-time across distributed data sources without copying or otherwise moving data from its system of record. Alternatively, the disclosed embodiments may be implemented using asynchronous software such as Extract/Transform/Load ("ETL") data integration tools, such as Talend Open Studio, published by Talend Inc. located in Los Altos, Calif.

Figure 4:
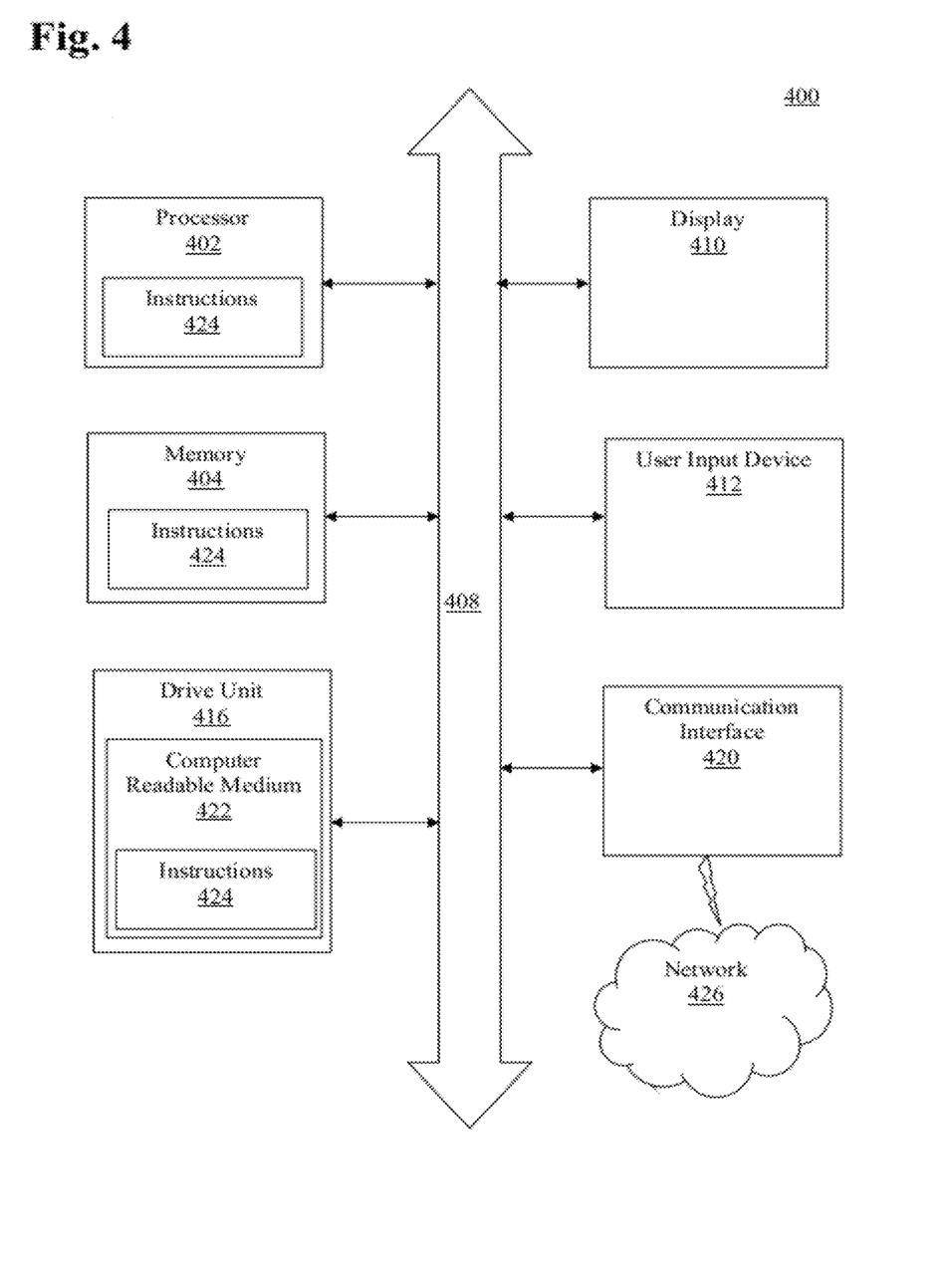
FIG. 4 depicts an exemplary computer system for use with the system of FIG. 1.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, including, but not limited to the project receiver, the object separator, the object disassociator, the task divider, the distributor, the results receiver and/or the compiler may be a computer system 400 or a component in the computer system 400.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions stored in the memory 404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 400 may further include a display unit 410, such as a liquid crystal display (LCD), an organic light emitting diode (OLED), a flat panel display, a solid state display, a cathode ray tube (CRT), a projector, a printer or other now known or later developed display device for outputting determined information. The display 410 may act as an interface for the user to see the functioning of the processor 402, or specifically as an interface with the software stored in the memory 404 or in the drive unit 416.

Additionally, the computer system 400 may include an input device 412 configured to allow a user to interact with any of the components of system 400. The input device 412 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 416. The disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 424 or receives and executes instructions 424 responsive to a propagated signal, so that a device connected to a network 426 can communicate voice, video, audio, images or any other data over the network 426. Further, the instructions 424 may be transmitted or received over the network 426 via a communication port 420. The communication port 420 may be a part of the processor 402 or may be a separate component. The communication port 420 may be created in software or may be a physical connection in hardware. The communication port 420 is configured to connect with a network 426, external media, the display 410, or any other components in system 400, or combinations thereof. The connection with the network 426 may be a physical connection, such as a wired Ethernet connection or may be established wirelessly as discussed below. Likewise, the additional connections with other components of the system 400 may be physical connections or may be established wirelessly.

The network 426 may include wired networks, wireless networks, or combinations thereof, and may be representative of the network in the drawings. The wireless network may be a cellular telephone network, an 802.11, 802.16, 802.20, or WiMax network. Further, the network 426 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

I claim:

1. A method of accessing a plurality of heterogeneous data sources, each of the plurality of heterogeneous data sources characterized by a heterogeneity different from a heterogeneity of at least one other of the plurality of heterogeneous data sources, the plurality of heterogeneous data sources being operative to store a plurality of data items, each of the plurality of data items being associated with at least one of a plurality of entities, the method comprising:

providing a data source identification processor operative to store association data representative of at least an association between each of the plurality of entities and each of the plurality of heterogeneous data sources and further representative of an association between each of the plurality of entities and each of the plurality of data items and in which each of the plurality of heterogeneous data sources each of the plurality of data items is stored, the data source identification processor being further operative to store access data in a database coupled therewith, the access data representative of the heterogeneity of each of the plurality of heterogeneous data sources, the heterogeneity being indicative of one or more characteristics of the data items stored in each of the plurality of heterogeneous data sources;

receiving a first request from a requestor specifying a first operation associated with at least one of the plurality of entities;

determining, by the data source identification processor, based on the specified at least one of the plurality of entities, a subset of the plurality of heterogeneous data sources to which the first operation should be performed;

determining, by the data source identification processor, based on the specified at least one of the plurality of entities, the heterogeneity of each of the determined subset of heterogeneous data sources;

generating and sending a data source request to each of the determined subset of the plurality of heterogeneous data sources, each data source request being generated based on the access data stored in the database to be compatible with the heterogeneity of the data source to which it is being sent, and specifying the first operation to be performed;

receiving, in response to the sending, at least one result of the performance of the first operation from at least one of the determined subset of the heterogeneous data sources;

augmenting each of the received at least one result with an identifier which identifies the entity of the specified at least one of the plurality of entities associated therewith; and providing the augmented at least one result to the requestor.

2. The method of claim 1 wherein the heterogeneity of each of the plurality of heterogeneous data sources comprises at least one of file format, access protocol, query language, data representation, inter-data source relationship, or combinations thereof.

3. The method of claim 1 wherein each of the plurality of heterogeneous data sources is operative to store at least one of the plurality of data items.

4. The method of claim 1 wherein the first operation comprises one of a read operation, a store operation, an update operation or a combination thereof.

5. The method of claim 1 wherein the first operation further specifies a subset of the plurality of data items associated with the at least one of the plurality of entities with respect to which the first operation is to be performed.

6. The method of claim 1 wherein the determining further comprises accessing the association data and the access data based on the at least one of the plurality of entities associated with the first operation.

7. The method of claim 1 wherein the augmenting further comprises homogenizing each of the at least one result prior to the providing to remove the heterogeneity of the at least one of the determined subset of the heterogeneous data sources from which the at least one result was received.

8. The method of claim 1 wherein the first request further specifies the first operation associated with the at least one entity and a second entity, different therefrom, of the plurality of entities, the providing further comprising providing only the augmented at least one result associated with the at least one entity to the requestor.

9. The method of claim 1 wherein each of the data source requests are sent substantially simultaneously.

10. The method of claim 1 wherein the determined subset of the plurality of heterogeneous data sources comprises all of the plurality of heterogeneous data sources.

11. The method of claim 1 further comprising:
providing a first interface associated with a first entity of the plurality of entities;
receiving the first request via the first interface from the requestor, wherein the first request does not identify the first entity; and
associating the first entity with the first request based on receipt of the first request via the first interface and the association of the first entity with the first interface.

12. The method of claim 11 wherein the first interface is perceived as a database table specific to the first entity.

13. The method of claim 1 wherein at least one of the plurality of heterogeneous data sources is operated by an entity different from another entity which operates another of the plurality of heterogeneous data sources.

14. The method of claim 1 wherein the data source identification processor and the plurality of heterogeneous data sources are operated by the same entity.

15. A system for providing access to a plurality of heterogeneous data sources, each of the plurality of heterogeneous data sources characterized by a heterogeneity different from a heterogeneity of at least one other of the plurality of heterogeneous data sources, the plurality of heterogeneous data sources being operative to store a plurality of data items, each of the plurality of data items being associated with at least one of a plurality of entities, the system comprising:
a data source identification processor operative to store association data representative of at least an association between each of the plurality of entities and each of the plurality of heterogeneous data sources and further representative of an association between each of the plurality of entities and each of the plurality of data items and in which each of the plurality of heterogeneous data sources each of the plurality of data items is stored, the data source identification processor being further operative to store access data in a database coupled therewith, the access data representative of the heterogeneity of each of the plurality of heterogeneous data sources, the heterogeneity being indicative of one or more characteristics of the data items stored in each of the plurality of heterogeneous data sources;
a request interface operative to receive a first request from a requestor wherein the first request specifies a first operation associated with at least one of the plurality of entities;
the data source identification processor being coupled with the request interface and further operative, based on the specified at least one of the plurality of entities, to determine a subset of the plurality of heterogeneous data sources to which the first operation should be performed and to determine the heterogeneity of each of the determined subset of heterogeneous data sources;
the system further comprising a request generator coupled with the data source identification processor and operative to generate and send a data source request to each of the determined subset of the plurality of heterogeneous data sources, each data source request being generated based on the access data stored in the database to be compatible with the heterogeneity of the data source to which it is being sent, and specifying the first operation to be performed; and
a result processor operative to receive, in response to the sending, at least one result of the performance of the first operation from at least one of the determined subset of the heterogeneous data sources, the result processor being further operative to augment each of the received at least one result with an identifier which identifies the entity of the specified at least one of the plurality of entities associated therewith, and provide the augmented at least one result to the requestor.

16. The system of claim 15 wherein the heterogeneity of each of the plurality of heterogeneous data sources comprises at least one of file format, access protocol, query language, data representation, inter-data source relationship, or combinations thereof.

17. The system of claim 15 wherein each of the plurality of heterogeneous data sources is operative to store at least one of the plurality of data items.

18. The system of claim 15 wherein the first operation comprises one of a read operation, a store operation, an update operation or a combination thereof.

19. The system of claim 15 wherein the first operation further specifies a subset of the plurality of data items associated with the at least one of the plurality of entities with respect to which the first operation is to be performed.

20. The system of claim 15 wherein the data source identification processor is further operative to access the association data and the access data based on the at least one of the plurality of entities associated with the first operation.

21. The system of claim 15 wherein the result processor is further operative to homogenize each of the at least one result, prior to the provision of the augmented at least one result, to remove the heterogeneity of the at least one of the determined subset of the heterogeneous data sources from which the at least one result was received.

22. The system of claim 15 wherein the first request further specifies the first operation associated with the at least one entity and a second entity, different therefrom, of the plurality of entities, the result processor being further operative to provide only the augmented at least one result associated with the at least one entity to the requestor.

23. The system of claim 15 wherein each of the data source requests are sent substantially simultaneously.

24. The system of claim 15 wherein the determined subset of the plurality of heterogeneous data sources comprises all of the plurality of heterogeneous data sources.

25. The system of claim 15 further comprising:
a first interface associated with a first entity of the plurality of entities, the first interface being operative to receive the first request via the first interface from the requestor, wherein the first request does not identify the first entity, and further operative to associate the first entity with the first request based on receipt of the first request via the first interface and the association of the first entity with the first interface.

26. The system of claim 25 wherein the first interface is perceived as a database table specific to the first entity.

27. The system of claim 15 wherein at least one of the plurality of heterogeneous data sources is operated by an entity different from another entity which operates another of the plurality of heterogeneous data sources.

28. The system of claim 15 wherein the data source identification processor and the plurality of heterogeneous data sources are operated by the same entity.

29. A system for providing access to a plurality of heterogeneous data sources, each of the plurality of heterogeneous data sources characterized by a heterogeneity different from a heterogeneity of at least one other of the plurality of heterogeneous data sources, the plurality of heterogeneous data sources being operative to store a plurality of data items, each of the plurality of data items being associated with at least one of a plurality of entities, the system comprising a processor and a memory coupled with the processor, the system further comprising:
first logic stored in the memory and executable by the processor to store association data representative of at least an association between each of the plurality of entities and each of the plurality of heterogeneous data sources and further representative of an association between each of the plurality of entities and each of the plurality of data items and in which each of the plurality of heterogeneous data sources each of the plurality of data items is stored, the first logic being further executable by the processor to store access data in a database coupled therewith, the access data representative of the heterogeneity of each of the plurality of heterogeneous data sources, the heterogeneity being indicative of one or more characteristics of the data items stored in each of the plurality of heterogeneous data sources;
second logic stored in the memory and executable by the processor to receive a first request from a requestor wherein the first request specifies a first operation associated with at least one of the plurality of entities;
the first logic being coupled with the second logic, the first logic being further operative to, based on the specified at least one of the plurality of entities, determine a subset of the plurality of heterogeneous data sources to which the first operation should be performed and to determine the heterogeneity of each of the determined subset of heterogeneous data sources;
the system further comprising third logic stored in the memory and executable by the processor to generate and send a data source request to each of the determined subset of the plurality of heterogeneous data sources, each data source request being generated based on the access data stored in the database to be compatible with the heterogeneity of the data source to which it is being sent, and specifying the first operation to be performed; and
fourth logic stored in the memory and executable by the processor to receive, in response to the sending, at least one result of the performance of the first operation from at least one of the determined subset of the heterogeneous data sources, the fourth logic being executable by the processor to augment each of the received at least one result with an identifier which identifies the entity of the specified at least one of the plurality of entities associated therewith, and provide the augmented at least one result to the requestor.

* * * * *